United States Patent [19]

Chandrasekaran et al.

[11] Patent Number: 4,775,709

[45] Date of Patent: Oct. 4, 1988

[54] THERMAL STABILIZER FOR THERMOPLASTIC POLYMERS

[75] Inventors: Swayambu Chandrasekaran, Mountain Lakes; Nikhil Kundel, Piscataway, both of N.J.

[73] Assignee: Ausimont, U.S.A., Inc., Morristown, N.J.

[21] Appl. No.: 69,773

[22] Filed: Jul. 6, 1987

[51] Int. Cl.$^4$ .............................................. C08K 5/52
[52] U.S. Cl. ................................. 524/151; 524/153; 524/147; 524/219; 524/544; 524/545
[58] Field of Search ............... 524/219, 151, 153, 147, 524/546, 545, 544

[56] References Cited

U.S. PATENT DOCUMENTS

| | | | |
|---|---|---|---|
| 3,745,145 | 7/1973 | Khattab et al. | 524/400 |
| 3,773,698 | 11/1973 | Khattab et al. | 524/146 |
| 3,853,811 | 12/1974 | Chandrasekaran | 524/305 |
| 3,903,045 | 9/1975 | Chandrasekaran et al. | 524/546 |
| 4,070,341 | 1/1978 | Schulze | 524/546 |
| 4,145,556 | 3/1979 | Hirsch et al. | 524/219 |
| 4,154,723 | 5/1979 | Hirsch et al. | 524/219 |
| 4,248,763 | 2/1981 | Yoshimura et al. | 524/546 |
| 4,276,214 | 6/1981 | Yoshimura et al. | 524/546 |
| 4,304,714 | 12/1981 | Wheeler et al. | 524/219 |

FOREIGN PATENT DOCUMENTS 0048562  3/1982  European Pat. Off. .

OTHER PUBLICATIONS

Paul W. Jonmaire, Edward J. Sowinski, Larry A. Gephart, Peter J. Becci, "Subchronic Feeding Study in Beagle Dogs of 2,2'-Oxamidobis [Ethyl 3(3,5-Di-tert-Butyl-4-Hydroxyphenyl) Propionate]"*Journal of Toxicology and Environmental Health,*" vol. 16, pp. 227-283, 1985.

Janet D. Capoluop, "Stabilizing Strategies for LLDPE Resins", *Plastics Engineering,* Jul. 1985, pp. 35-38.

Job J. Zeilstra, "Heat Stabilization of Segmented Copoly (Ether Ester)s" *Die Angewandte Makromolekulare Chemie,* vol. 137, pp. 83-92 (1985).

*Primary Examiner*—Veronica P. Hoke
*Attorney, Agent, or Firm*—John G. Gilfillan; Elliot M. Olstein; Raymond J. Lillie

[57] ABSTRACT

An improved melt-processable composition of a thermoplastic polymer selected from the class consisting of hexafluoroisobutylene/vinylidene fluoride copolymer, and ethylene/chlorotrifluoroethylene copolymer, wherein added to said thermoplastic polymer are a phosphite ester and an oxamidoester. A preferred phosphite ester is tris (2,4-di-tert-butylphenyl) phosphite, and a preferred oxamidoester is 2,2'-oxamidobis [ethyl 3-(3,5-di-tert-butyl-4-hydroxyphenyl) propionate]. In a preferred composition, about 1 wt. % of phosphite ester and about 0.5 wt. % of oxamidoester are added to a hexafluoroisobutylene/vinylidene fluoride copolymer.

11 Claims, No Drawings

THERMAL STABILIZER FOR THERMOPLASTIC POLYMERS

This application relates to a thermal stabilizer which is added to thermoplastic polymers such as a copolymer of hexafluoroisobutylene and vinylidene fluoride, and ethylene/chlorotrifluoroethylene copolymers, in order to provide for an improved thermostable, melt-processable composition. For example, copolymers of 3,3,3-trifluoro-2-trifluoromethyl propene, hereinafter referred to as hexafluoroisobutylene, and 1,1-difluoroethylene, hereinafter referred to as vinylidene fluoride, are known to have high-temperature mechanical properties such as elastic modulus, flex modulus, tensile strength, and tensile and compressive creep, superior to polytetrafluoroethylene, or PTFE. These copolymers, however, have marginal thermal stability at melt processing temperatures of 340° to 360° C. The most prevalent types of thermal degradation in this polymer are oxidation of C—H bonds and scission along the main chain C—C bonds. Therefore, clearly there is a need in the melt processing art for a thermal stabilizer for hexafluoroisobutylene/vinylidene fluoride copolymers, as well as the other above-mentioned polymers, so that one can take full advantage of the superior high-temperature mechanical properties of melt-processable compositions containing hexafluoroisobutylene/vinylidene fluoride copolymers, and ethylene/chlorotrifluoroethylene copolymers.

It is therefore the object of this application to provide a thermal stabilizer for hexafluoroisobutylene/vinylidene fluoride copolymers, and ethylene/chlorotrifluoroethylene copolymers, which results in an improved melt processable and thermostable coposition. The improvement in thermal stability is a result of the addition of a phosphite ester of the formula P—(OR)$_3$, wherein R is hydrogen or an alkyl, cycloalkyl, aralkyl, aryl, or a hydroxy-substituted alkyl group of from 1 to about 18 carbon atoms, and an oxamidoester of the formula $$(R_1-\overset{O}{\overset{\|}{C}}-O-R_2-\overset{H}{\overset{|}{N}}-\overset{O}{\overset{\|}{C}}-)_2$$

wherein R$_1$ is of the formula

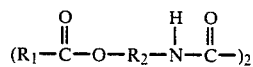

wherein
n is from 1 to about 18 and
m is from 1 to about 6 and
R$_2$ is of the formula

where n is from 1 to about 9.

The phosphite ester and oxamidoester are added in amounts effective to achieve increased melt stability and increased thermal stability of the thermoplastic copolymer. Preferably, in the phosphite ester, R is of the formula

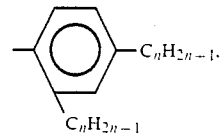

wherein n is from 1 to about 9. A most preferred phosphite ester is tris(2,4,-di-tert-butyl-phenyl)phosphite. Other representative phosphite esters are triphenyl phosphite, trisnonylphenyl phosphite, distearyl phosphite, and phenyl neopentylglycol phosphite. Preferred oxamidoesters are 2,2'-oxamidobis[ethyl 3-(3,5-di-tert-butyl-4-hydroxyphenyl)propionate] and 2,2'-oxamidobis[n-propyl 3-(3,5-di-tert-butyl-4-hydroxyphenyl)propionate]. The most preferred oxamidoester is 2,2' oxamidobis[ethyl 3-(3,5-di-tert-butyl-4-hydroxyphenyl)propionate]. The addition of these compounds in effective amounts results in increased thermal stability as evidenced by a decrease in weight loss due to thermal degradation in air.

The thermoplastic polymer may be present in amounts from about 97 wt% to about 99.5 wt. %, preferably at about 98.5 wt.% of the total composition, the phosphite ester may be present in amounts from about 0.5 wt.% to about 2 wt.%, preferably at about 1 wt.% of the total composition, and the oxamidoester is present in amounts from about 0.25 wt.% to about 1 wt%, preferably at about 0.5 wt.% of the total composition. A preferred thermoplastic polymer is hexafluoroisobutylene/vinylidene fluoride copolymer, a preferred phosphite ester is tris(2,4-di-tert-butyl-phenyl)phosphite, and a preferred oxamidoester is 2,2'-oxamidobis[ethyl 3-(3,5-di-tert-butyl-4-hydroxyphenyl)propionate].

The structure of tris(2,4-di-tert-butyl-phenyl)phosphite is as follows:

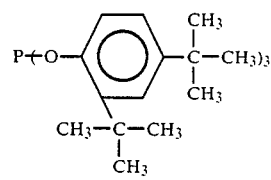

A preferred embodiment of this compound for purposes of this application is Naugard 524 ™, a product of Uniroyal Company.

The structure of 2,2'-oxamidobis[ethyl 3-(3,5-di-tert-butyl-4-hydroxyphenyl)propionate] is as follows:

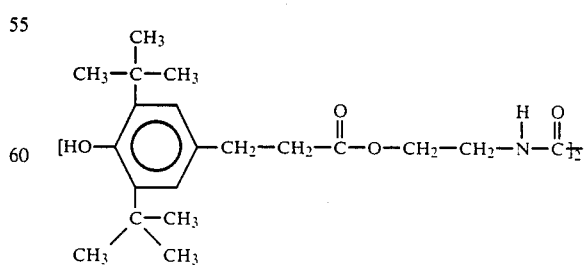

A preferred embodiment for purposes of this application is Naugard XL-1, ™ also a product of Uniroyal Company. For purposes of this application, Naugard 524 will be referred to as Additive 1 and Naugard XL-1 will be referred to as Additive 2.

The thermoplastic polymers may be of low or high melt index (MI). Low MI ranges may be from 0.1 to 15, and high MI ranges may be from 16 to 50. The polymers may be suspension polymers, which are polymers prepared in aqueous suspension polymerization using a suitable suspending agent, or emulsion polymers, which are polymers prepared in aqueous emulsion polymerization using a suitable emulsifying agent.

In cases wherein a hexafluoroisobutylene/vinylidene fluoride copolymer is used, the hexafluoroisobutylene may be present in amounts from about 30 mole % to about 60 mole % of the copolymer, preferably from about 40 mole % to about 55 mole % of the copolymer. The vinylidene fluoride may be present in amounts from about 40 mole % to about 70 mole % of the copolymer, preferably from about 45 mole % to about 60 mole % of the copolymer.

Melt index measurements for the polymers and the polymers with the thermal stabilizer additives of this application may be made in a melt indexer at temperatures from about 340° C. to about 360° C. For the specific examples of this application, melt index measurements are made in a Tinius Olsen melt indexer using a 1/16" orifice at a temperature of 350° C. and a load, which is the weight placed on the piston of the melt indexer, of 2,160 grams. Before making melt index measurements, blending of the stabilized components with the polymer can be carried out by ball milling or melt blending.

Melt blending is a process of blending an ingredient with the polymer in the molten state as in a Brabender plastograph or in a Banbury mixer.

Ball milling involves placing a sample of the polymer and additives in a horitzontal rotating cylindrical or conical chamber made of a material such as a ceramic. The chamber is approximately half full of ceramic balls or flint stones. Size reduction and blending is accomplished by the impact of these balls as they fall back after being lifted by the rotating chamber.

Percentage weight loss determinations for the polymers and the polymers with the added thermal stabilizer were done using thermogravimetric analysis using a DuPont 9900 Thermal Analyzer.

For the thermal decomposition studies, an accurately weighed amount of polymer or polymer with thermal stabilizers in powder form in an amount from 4 to 16 mg is placed in a 3.5 mm diameter by 12 mm high glass sample cup. The cup is placed in a precision temperature-controlled microfurnace located at the center of a closed 250 ml glass reservoir containing argon or air at standard temperature and pressure (0° C., 760 mmHg). The sample is then heated to the desired temperature (350° C. or 375° C.) and the weight of sample is recorded at intervals for 60 minutes. The total % weight loss in one hour is measured for each sample. In another type of experiment, the volatile decomposition products formed on heating the polymer at 330° C., 350° C. and 370° C. are measured by on-line gas chomatography and mass spectrometry.

The following examples will give a better understanding of the superior melt-processable characteristics of the polymers containing the thermostabilizer compositions of this application.

EXAMPLES 1–3

Suspension copolymers of hexafluoroisobutylene/vinylidene fluoride of low molecular weight and high molecular weight and an emulsion copolymer of hexafluoroisobutylene/vinylidene fluoride were charged to a Tinius Olsen melt indexer, heated at a temperature of 350° C., and extruded under a load of 2,160 g. The extrudates were collected at time intervals of 6 minutes, 30 minutes, and 60 minutes and the melt indices were measured at each interval. The data show that degradation of the copolymer has occurred in the unstabilized copolymers, as evidenced by substantial increase in melt index with prolonged heating, which indicates a decrease in molecular weight of the copolymers as a result of chain scission.

| Example | Sample | Melt Stability at 350° C. | | |
|---|---|---|---|---|
| | | Melt Index at 6 min. | Melt Index at 30 min. | Melt Index at 60 min. |
| 1 | Low molecular weight suspension copolymer | 31.2 | Too high to measure. | Too high to measure. |
| 2 | High molecular weight suspension copolymer | 4.4 | 10.9 | 37.6 |
| 3 | Emulsion copolymer | 1.3 | 19.0 | Too high to measure. |

EXAMPLES 4–5

Low molecular weight and high molecular weight suspension hexafluoroisobutylene/vinylidene fluoride copolymers were melt sheared in a Brabender plastograph at 350° C. at 50 RPM for 30 minutes. Melt shearing is a mastication of molten polymer between two corotating or counter-rotating screws. This process results in thermo-mechanical degradation of the polymer. Then, these copolymers were subjected to the same melt index measuring procedure as in Example 1–3.

| Example | Sample | Melt Stability at 350° C. | | |
|---|---|---|---|---|
| | | Melt Index at 6 min. | Melt Index at 30 min. | Melt Index at 60 min. |
| 4 | Low molecular weight suspension copolymer | Too high to measure. | Too high to measure. | Too high to measure. |
| 5 | High molecular weight suspension copolymer | 12.9 | 63.6 | Too high to measure. |

EXAMPLES 6–8

The copolymers of Examples 1–3 were mixed with 1 wt.% of Additive 1* and 0.5% Additive 2** and ball milled for 30 minutes in a laboratory ball mill. These blends of the copolymers with the additive mixtures were then subjected to the same melt index measuring procedure as the copolymers of Examples 1–3.

| Example | Sample | Melt Stability at 350° C. | | |
|---|---|---|---|---|
| | | Melt Index at 6 min. | Melt Index at 30 min. | Melt Index at 60 min. |
| 6 | 98.5 wt. % Low molecular weight suspension copolymer 1 wt. % Addi- | 10.4 | 17.4 | 37.2 |

-continued

| Example | Sample | Melt Stability at 350° C. | | |
|---|---|---|---|---|
| | | Melt Index at 6 min. | Melt Index at 30 min. | Melt Index at 60 min. |
| | tive 1* 0.5 wt. % Additive 2** | | | |
| 7 | 98.5 wt. % High molecular weight suspension copolymer 1 wt. % Additive 1* 0.5 wt. % Additive 2** | 4.8 | 8.5 | 25.6 |
| 8 | 98.5 wt. % Emulsion copolymer 1 wt. % Additive 1* 0.5 wt. % Additive 2** | 0.9 | 2.6 | 8.4 |

*Naugard 524-tris(2,4-di-tert-butyl phenyl)phosphite
**Naugard XL-1-2,2-oxamidobis [ethyl 3-(3,5-di-tert-butyl-4-hydroxyphenyl)propionate].

EXAMPLES 9-11

The dry blends of the copolymer and additive mixtures of Examples 6-8 were melt sheared in a Brabender plastograph at 350° C. at 50 RPM for 30 minutes. These samples were then subjected to the same melt index measuring procedure as the copolymers of Examples 1-3.

| Example | Sample | Melt Stability at 350° C. | | |
|---|---|---|---|---|
| | | Melt Index at 6 min. | Melt Index at 30 min. | Melt Index at 60 min. |
| 9 | 98.5 wt. % Low molecular weight suspension copolymer 1 wt. % Additive 1* 0.5 wt. % Additive 2** | 46.2 | Too high to measure. | Too high to measure. |
| 10 | 98.5 wt. % High molecular weight suspension copolymer 1 wt. % Additive 1* 0.5 wt. % Additive 2** | 6.4 | 12.8 | 34.2 |
| 11 | 98.5 wt. % Emulsion copolymer 1 wt. % Additive 1* 0.5 wt. % Additive 2** | 3.0 | 6.6 | 9.0 |

*Naugard 524
**Naugard XL-1

EXAMPLES 12-19

The samples of Examples 1, 2, 4, 5, 6, 7, 9, and 10 were tested for thermooxidative stability at 375° C. using thermogravimetric analysis.

Thermogravimetric analysis is the measurement of the weight of a sample as that sample is heated according to a predetermined temperature program. The test gives the changes in the sample weight as a function of temperature and time.

The components which make up an example of a thermogravimetric sample are a balance with a control unit, a furnace, which is a temperature-controlled enclosure for the sample, with a control unit, a first derivative computer, and a recorder. The sample is hung from the balance in a temperature-controlled furnace which is spatially separated from the balance. Performance of the balance therefore is not affected by the high temperature and corrosive decomposition products associated with the sample. The furnace is of low thermal mass and closely coupled to the sample for optimum temperature control and resolution. The first derivative computer determines the rate of weight loss of the sample. The output of the balance and of the first derivative are recorded simultaneously with the temperature.

| Example | Sample | Thermo-oxidative Stability at 375° C. % Weight Loss in 1 Hour | |
|---|---|---|---|
| | | In Argon | In Air |
| 12 | From Example 1 | 1.7 | 40.0 |
| 13 | From Example 2 | 0.6 | 1.3 |
| 14 | From Example 4 | 2.2 | 2.4 |
| 15 | From Example 5 | 1.2 | 1.7 |
| 16 | From Example 6 | 1.4 | 0.7 |
| 17 | From Example 7 | 1.4 | 1.9 |
| 18 | From Example 9 | 1.3 | 1.7 |
| 19 | From Example 10 | 0.5 | 1.1 |

EXAMPLES 20-23

Powder samples of low or high molecular weight copolymer or high molecular weight copolymer with Additive 1 and Additive 2 were placed in 3.5 mm diameter by 12 mm high glass sample cups. The amount of powder was from 4 to 16 mg. Each sample cup was then placed in a precision temperature-controlled microfurnace located at the center of a closed 250 ml glass reservoir containing air at standard temperature and pressure (0° C., 760 mm Hg). The samples were heated to temperature of 330° C., 350° C., and 370° C. Samples of the volatile products of degradation were taken from each powder sample at intervals of 1 minute, 10 minutes, and 60 minutes, and the amounts of hexafluoroisobutylene and vinylidene fluoride in the volatile gases were measured. The gaseous products from the heating were identified by on-line Gas Chromatography and Mass Spectrometry.

| | | | DECOMPOSITION PRODUCTS FROM HEXAFLUOROISOBUTYLENE/ VINYLIDENE FLUORIDE COPOLYMERS | | | | | |
|---|---|---|---|---|---|---|---|---|
| | | | HEXAFLUOROISOBUTYLENE EVOLVED AT | | | VINYLIDENE FLUORIDE EVOLVED AT | | |
| EX. NO. | SAMPLE | TIME MIN. | 330° C. | 350° C. | 370° C. | 330° C. | 350° C. | 370° C. |
| 20 | Low mol. wt. suspension copolymer | 1 | 0.08 | 0.07 | 0.14 | 0.05 | 0.05 | 0.05 |
| | | 10 | 0.10 | 0.27 | 2.91 | 0.05 | 0.09 | 1.84 |
| | | 60 | 0.22 | 8.91 | 33.5 | 0.05 | 4.44 | 1.70 |
| 21 | High mol wt. suspension copolymer | 1 | 0.18 | 0.22 | 0.21 | 0.1 | 0.1 | 0.1 |
| | | 10 | 0.19 | 0.24 | 0.30 | 0.1 | 0.1 | 0.1 |
| | | 60 | 0.20 | 0.49 | 0.75 | 0.1 | 0.1 | 0.2 |
| 22 | 98.5% wt. % Low mol. wt. suspension | 1 | 0.006 | 0.013 | 0.024 | 0.05 | 0.05 | 0.05 |
| | | 10 | 0.018 | 0.032 | 0.109 | 0.05 | 0.05 | 0.05 |
| | | 60 | 0.33 | 0.245 | 0.329 | 0.05 | 0.58 | −.125 |

-continued

| | | | DECOMPOSITION PRODUCTS FROM HEXAFLUOROISOBUTYLENE/ VINYLIDENE FLUORIDE COPOLYMERS | | | | | |
|---|---|---|---|---|---|---|---|---|
| | | | HEXAFLUOROISOBUTYLENE | | | VINYLIDENE FLOURIDE | | |
| | | TIME | EVOLVED AT | | | EVOLVED AT | | |
| EX. NO. | SAMPLE | MIN. | 330° C. | 350° C. | 370° C. | 330° C. | 350° C. | 370° C. |
| 23 | copolymer + 1% Additive 1* and 0.5% Additive 2** 98.5 wt. % High mol. wt. 1 wt. % Additive 1* 0.5 wt. % Additive 2** | 1<br>10<br>60 | 0.003<br>0.008<br>0.028 | 0.013<br>0.020<br>0.110 | 0.016<br>0.054<br>0.270 | 0.1<br>0.1<br>0.1 | 0.1<br>0.1<br>0.1 | 0.1<br>0.1<br>0.1 |

*Naugard 524
**Naugard XL-1

It is to be understood, however, that the inventive composition of this application is not to be limited by the specific compositions described above and mentioned in the examples. The additives of the present invention may be present in the overall composition in weight percentages other than those specifically mentioned. Also, testing procedures for the stability of the copolymer and additive compositions may be different from those described in the application and still be within the scope of the invention. It is also understood that the invention is not intended to be limited by the scope of the accompanying claims.

What is claimed is:

1. An improved thermostable melt-processable composition comprising a thermoplastic polymer selected from the class consisting of hexafluoroisobutylene/-vinylidene fluoride copolymer, and ethylene/chlorotrifluoroethylene copolymer, a phosphite ester of the formula P—(OR)$_3$, wherein R is hydrogen or an alkyl, cycloalkyl, aralkyl, aryl or a hydroxy-substituted alkyl group having from 1 to about 18 carbon atoms, and wherein at least one R group is other than hydrogen, and an oxamidoester of the formula

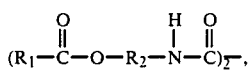

wherein R, is of the formula

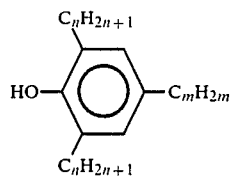

wherein
n is from 1 to about 18, and
m is from 1 to about 6, and R$_2$ is of the formula
—C$_n$H$_{2n}$—,
wherein n is from 1 to about 9, and wherein said phosphite ester and said oxamidoester are present in amounts effective in achieving increased melt stability and thermal stability of the thermoplastic polymer.

2. The composition of claim 1 wherein said phosphite ester is of the formula P—(OR)$_3$, and wherein R is of the formula

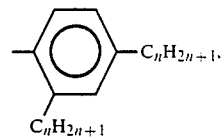

wherein n is from 1 to about 9.

3. The composition of claim 2 wherein said phosphite ester is tris(2,4-di-tert-butyl-phenyl)phosphite.

4. The composition of claim 1 wherein said oxamidoester is 2,2' oxamidobis[ethyl 3-(3,5-di-tert-butyl-4-hydroxyphenyl)propionate].

5. The composition of claim 1 wherein the thermoplastic polymer is hexafluoroisobutylene/vinylidene fluoride copolymer.

6. The composition of claim 1 wherein the thermoplastic polymer is present in an amount of from about 97 wt.% to about 99.5 wt.% of the total composition.

7. The composition of claim 6 wherein the thermoplastic polymer is present in an amount of about 98.5 wt.% of the total composition.

8. The composition of claim 1 wherein the phosphite ester is present in an amount of from about 0.5 wt.% to about 2 wt.% of the total composition.

9. The composition of claim 8 wherein the phosphite ester is present in an amount of about 1 wt.% of the total composition.

10. The composition of claim 1 wherein the oxamidoester is present in an amount of from about 0.25 wt.% to about 1 wt.% of the total composition.

11. The composition of claim 10 wherein the oxamidoester is present in an amount of about 0.5 wt.% of the total composition.

* * * * *